United States Patent [19]

Zysman et al.

[11] Patent Number: 5,775,095
[45] Date of Patent: Jul. 7, 1998

[54] METHOD OF NOISE SUPPRESSION FOR A TURBINE ENGINE

[75] Inventors: Steven H. Zysman, Middletown; Wesley K. Lord, Glastonbury; Thomas J. Barber, West Hartford, all of Conn.

[73] Assignee: United Technologies Corporation, Hartford, Conn.

[21] Appl. No.: 771,294

[22] Filed: Dec. 20, 1996

Related U.S. Application Data

[62] Division of Ser. No. 525,113, Sep. 8, 1995, Pat. No. 5,638,675.

[51] Int. Cl.$^6$ ........................................ F02K 1/38
[52] U.S. Cl. .............................. 60/204; 60/262; 181/213
[58] Field of Search ........................ 60/204, 262, 263, 60/264; 181/213, 220; 239/423, 265.11

[56] References Cited

U.S. PATENT DOCUMENTS

| | | | |
|---|---|---|---|
| 3,002,341 | 10/1961 | Muzzy et al. | 239/419 |
| 3,027,710 | 4/1962 | Maytner | 60/35.6 |
| 3,048,376 | 8/1962 | Howald et al. | 259/4 |
| 3,377,804 | 4/1968 | Wright et al. | 60/262 |
| 3,514,955 | 6/1970 | Paulson et al. | 60/262 |
| 3,673,802 | 7/1972 | Krebs et al. | 60/226 |
| 3,710,890 | 1/1973 | True et al. | 181/33 |
| 4,045,957 | 9/1977 | DiSabato | 60/262 |
| 4,077,206 | 3/1978 | Ayyagari | 60/262 |
| 4,117,671 | 10/1978 | Neal et al. | 60/264 |
| 4,226,085 | 10/1980 | Johnson | 60/262 |
| 4,302,934 | 12/1981 | Wynoski et al. | 60/262 |
| 4,335,801 | 6/1982 | Stachowiak et al. | 181/220 |
| 4,401,269 | 8/1983 | Eiler | 239/265.17 |
| 4,487,017 | 12/1984 | Rodgers | 60/262 |
| 4,501,393 | 2/1985 | Klees et al. | 239/265.13 |
| 4,576,002 | 3/1986 | Mavrocostas | 60/264 |
| 4,592,201 | 6/1986 | Dusa et al. | 60/262 |
| 4,754,924 | 7/1988 | Shannon | 181/220 |
| 4,786,016 | 11/1988 | Presz, Jr. et al. | 244/130 |
| 4,813,230 | 3/1989 | Braithwaite | 60/262 |
| 4,835,961 | 6/1989 | Prez, Jr. et al. | 60/262 |
| 4,909,346 | 3/1990 | Torkelson | 181/213 |
| 5,060,471 | 10/1991 | Torkelson | 60/262 |
| 5,157,916 | 10/1992 | Wynosky et al. | 60/204 |
| 5,167,118 | 12/1992 | Torkelson | 60/226.1 |
| 5,235,813 | 8/1993 | McVey et al. | 60/737 |
| 5,265,408 | 11/1993 | Shoeran et al. | 60/262 |
| 5,315,815 | 5/1994 | McVey et al. | 60/39.06 |
| 5,440,875 | 8/1995 | Torkelson et al. | 60/226.1 |
| 5,638,675 | 6/1997 | Zysman | 60/262 |

OTHER PUBLICATIONS

Greatrex, F.B. "Reduction of Jet Noise", Flight, V. 68, No. 2424, pp. 57–60, date: Jul./1955.

*Primary Examiner*—Timothy Thorpe
*Assistant Examiner*—Ted Kim
*Attorney, Agent, or Firm*—Kenneth C. Baran

[57] ABSTRACT

A method for suppressing noise in a turbofan engine includes segmenting coaxial inner and outer flow streams into circumferentially interleaved inner and outer segments beginning at a common location along the engine axis, diverting additional portions of the outer stream radially inwardly from an axial location downstream of the common location and combining the inner segments, the outer segments and the additional portions into a common stream so that the additional portions are introduced into discrete radial locations in the common stream. The diverted additional portions of the outer stream eliminate localized regions of hot, high velocity gases in the combined stream to achieve improved noise suppression.

2 Claims, 2 Drawing Sheets

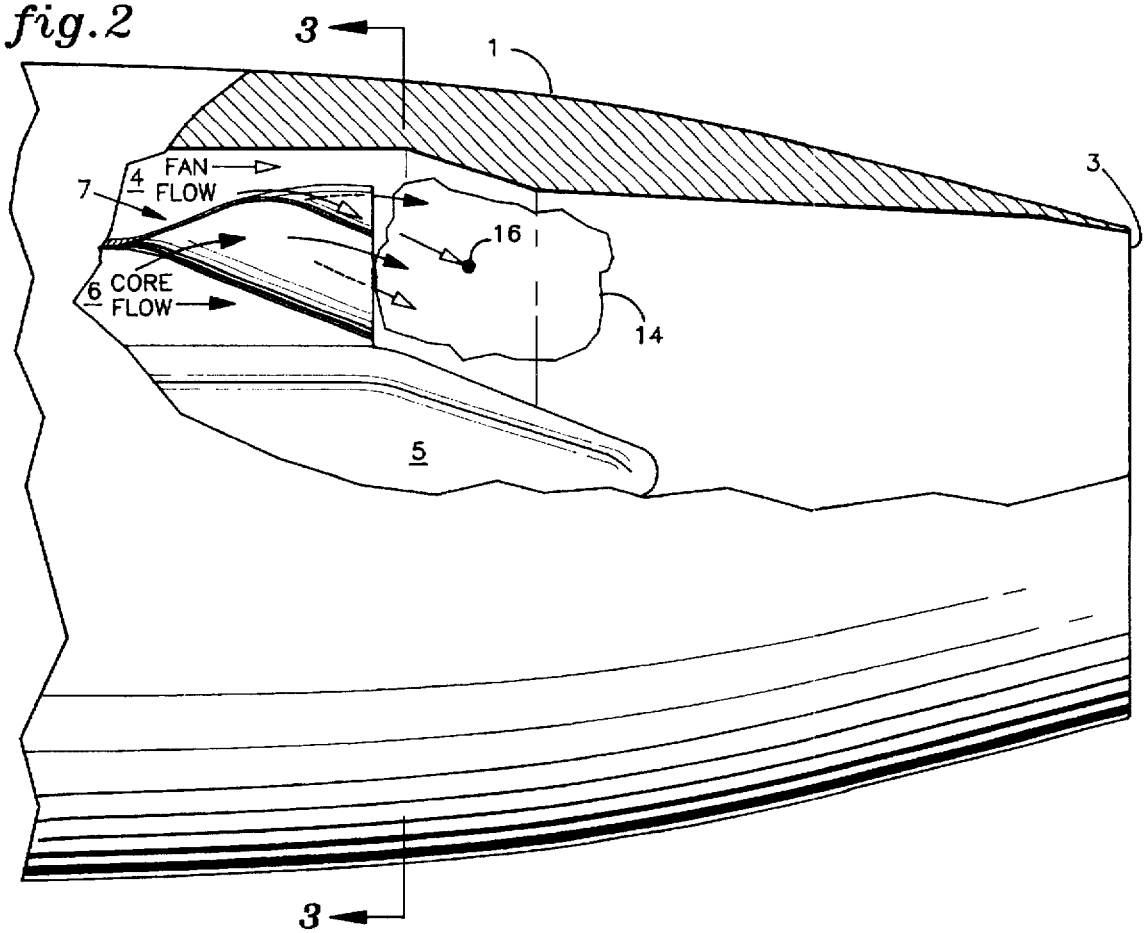
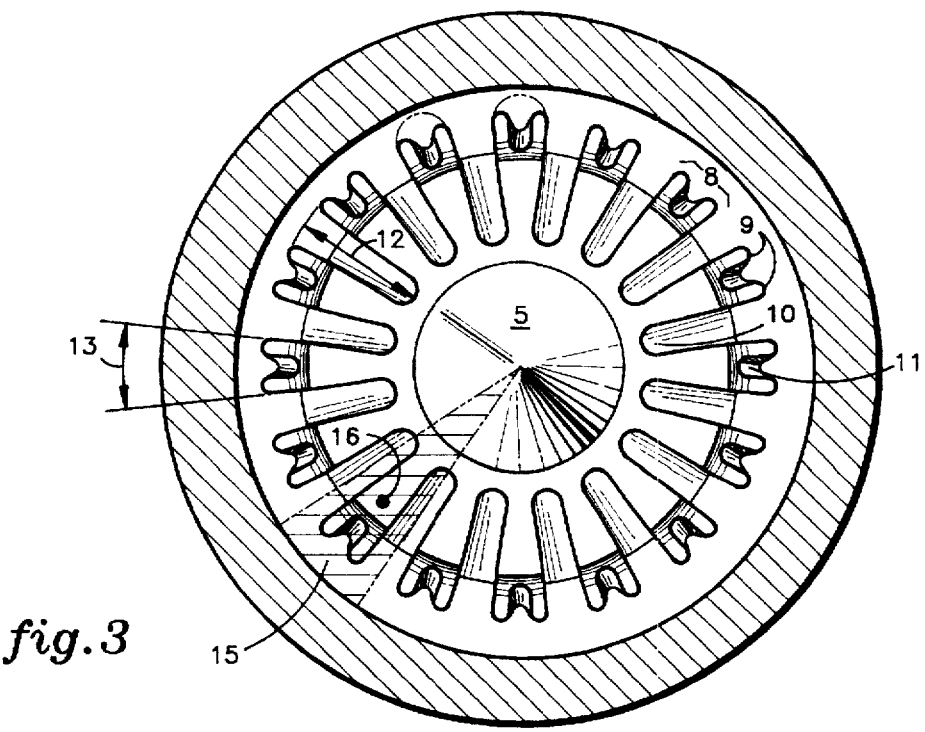

METHOD OF NOISE SUPPRESSION FOR A TURBINE ENGINE

This application is a division of application Ser. No. 08/525,113 filed on Sep. 8, 1995, now U.S. Pat. No. 5,638,675.

TECHNICAL FIELD

This invention relates to a method of suppressing noise emissions from a gas turbine engine.

BACKGROUND ART

Noise generated by jet aircraft engines during takeoff and landing is a serious environmental problem and a matter of public concern in most parts of the world. Jet aircraft engines discharge a large volume of high velocity gases from their exhaust nozzles. Shearing forces between these high velocity gases and the ambient air produce a significant component of the high noise levels that many find objectionable. Because of the adverse impact noise has on the environment, many countries have imposed strict noise emission standards on aircraft. In the United States, the Federal Aviation Administration has imposed strict noise emission standards which will place stringent operating restrictions on aircraft that are currently in use. These restrictions range from financial penalties and schedule restrictions to an outright ban on the use of the aircraft. An effective and efficient method of noise attenuation is necessary since these restrictions severely curtail the useful life of certain types of aircraft that commercial airlines are currently using. For background information related to noise reduction systems for jet engines, reference may be made to the following U.S. Pat. Nos. 3,710,890; 4,077,206; 4,117,671; 4,302,934; 4,401,269; 4,501,393; 4,909,346; 5,060,471; 5,167,118; and 5,440,875.

Sound is caused by pressure waves in the air, set in motion by a source. The amplitude of the pressure waves determines the intensity of the sound and can be measured by instrumentation. The degree to which a sound is annoying to a listener is determined by the intensity and duration of that sound. In the turbofan engine industry, the effect of noise on humans is expressed in terms of an effective perceived noise intensity level, EPNdB, based on the bel unit system for noise intensity.

Generally speaking, the jet noise generated by turbofan engines is dominated by two sources: the fan or bypass flow stream flowing through the engine's fan section and the core or primary flow stream flowing through the engine's core. These two flow streams are axially concentric streams which are discharged from the engine's exhaust nozzle, to produce useful thrust.

Turbofan engines are categorized as either high bypass ratio or low bypass ratio based on the ratio of the mass flow rates of bypass flow stream to core flow stream. As air enters the front of the jet engine it passes through the fan and is split into primary and bypass flow streams. The primary stream flows through one or more compressors which compress the air to a high pressure. The air is then mixed with fuel in a combustion chamber and the mixture is ignited and burned. The resultant combustion products then flow through one or more turbines which extract energy from the combustion gases to turn the fan and compressor. The gases then expand through an exhaust nozzle to produce thrust. The bypass stream is compressed by the fan, flows through an annular duct concentric with the core engine and is expanded through the exhaust nozzle to produce additional thrust. Generally, turbofan engines having a bypass ratio of two or less are categorized as low bypass ratio engines. In low bypass ratio engines the core flow and the bypass flow enter the exhaust nozzle at the nearly the same pressure but not at the same velocity or temperature. It is a characteristic of a turbofan engine that noise increases with increased relative difference in velocity between the fan and core streams and that velocity is proportional to temperature. In a typical turbofan engine with a bypass ratio approximately equal to two, at a given power setting, the flow temperature and velocity in the primary duct are typically on the order of 940° F. and 861 ft/s respectively, and the fan duct flow temperature and velocity for the same power setting are 220° F. and 442 ft/s. Noise from the jet exhaust of the core flow is generated in regions behind the engine by the unforced and therefore incomplete mixing of the core and fan exhaust streams and also by the unforced mixing of the exhaust streams, particularly the core stream, with the ambient air.

Experience in the turbofan industry has proven that the mixing of the two air streams into an aggregate stream before they exit the exhaust nozzle is beneficial in reducing perceived noise levels since the exhaust nozzle shields observers from the mixing induced noise and since the exhaust nozzle is typically lined with a noise attenuating liner. This is particularly true if the mixing of the core and fan streams is forced rather than unforced. Typically, there is a larger volume of low velocity, low temperature fan flow than of high velocity, high temperature primary flow, and forced mixing of the two flow streams lowers the velocity of the mixed air stream and therefore, lowers the overall perceived noise level. In a typical low bypass ratio turbofan engine, the two flow streams, unless they are mixed, remain substantially distinct as they exit the exhaust nozzle of the engine and the perceived noise level remains high. In general, a more homogeneous mixed flow, prior to exiting the engine's exhaust nozzle, will result in a lower overall temperature and velocity of the mixed the flow, which in turn results in a lower perceived noise level.

The object of forced mixing within the engine is to lower the overall velocity of the aggregate flow stream before combining that stream with the ambient air thereby decreasing the noise produced by the exhaust jet mixing with the ambient air. Many methods have been developed in an attempt to optimize forced mixing, one in particular being a method which is carried out with a lobed mixer. Commercial lobed mixers typically achieve noise reductions in the range of 3.5 to 4.5 EPNdB. Since the early 1960's forced mixing, as described in U.S. Pat. No. 3,027,710, has been used to reduce the noise produced by low bypass ratio turbofan jet engines. Such forced mixing for noise reduction is commonly accomplished through the use of a lobed mixer attached to the engine near the turbine exit, upstream of the exhaust nozzle discharge plane. The lobed mixer typically has a number of circumferentially spaced lobes of increasing radial height in the axial downstream direction, arranged so that chutes are formed between the lobes. The fan air stream is directed through the chutes between the lobes on the outer surface of the mixer and the primary or core stream flows through chutes defined by the lobes on the inside surface of the mixer. The chutes and lobes force the hot, high velocity core flow stream to mix with the larger volume cooler, low velocity fan air stream. Due to less than complete mixing effected by prior art lobed mixers, the aggregate flow stream downstream of the mixer contains a number of discrete segments of mixed air. The number of segments produced is equal to the number of mixer lobes and the segments are essentially similar in temperature profile. However, one problem with the mixed flow stream produced by conventional lobed mixers is that the temperature varies in the radial direction within each downstream segment such that local hot spots arise near the center of each lobe location. These local hot spots are made up of hot, high velocity gases and are caused by incomplete mixing of the two streams within the exhaust duct. With prior art lobed mixers, it is virtually impossible to eliminate such hot spots without reducing the effectiveness of the lobed mixer as a sound suppression device.

Forced mixing has also been used for other purposes such as in U.S. Pat. No. 3,048,376, Howald et al. In the Howald patent the mixer is used to achieve a mix of the fan flow and core flow before the gas enters an afterburner to realize a more efficient combustion in the afterburner itself. This type of application differs greatly from the use of a mixer in commercial aircraft for noise reduction purposes. First, the Howald et al mixer is positioned just in front of the afterburner inside the engine duct, a substantial distance upstream of the exhaust nozzle, and is an integral part of the combustion process. Second, afterburners are typically used on military aircraft where noise levels are not a primary concern. Third, the Howald et al mixer has secondary lobes running the full length of the mixer accounting for a large increase in surface area, resulting in pressure losses which may be unacceptably high from a commercial perspective. Lastly, since the mixer is upstream of the afterburner, the mixed gas is subsequently infused with fuel and ignited in the afterburner, further accelerating the gas which generates a tremendous level of noise when it finally exits the exhaust nozzle of the engine. Because the gas is much hotter and flowing at a much higher velocity than in an engine without an afterburner, any beneficial effect of the mixer as a noise reduction device is overwhelmed.

The practice of forced mixing for noise reduction does not come without cost. Frequently, increased mixing for noise reduction comes at the expense of increased flow losses which result in performance losses and reduced fuel efficiencies for the same power level settings. For example, in a commercial aircraft, a one percent loss in performance could result in a decrease of over twenty five nautical miles in maximum range and an increase of one half of a percent in operating costs.

The objective of mixing two flow streams with a lobed mixer is to achieve the highest level of uniform mixing of two flows streams prior to exiting the exhaust nozzle. A common belief within the industry is that improved uniformity of the mixed flow stream and greater reduction in perceived noise is attainable by increasing the quantity of lobes in a lobed mixer. A mixer with a large number of lobes attempts to produce a uniform mix circumferentially about the engine centerline at the exit plane of the exhaust nozzle. However, when the number of lobes is increased, so too is the surface area over which the gas must flow prior to exiting the exhaust nozzle. When the area is increased the pressure losses due to drag across these surfaces increases. The converse is also true. The fewer lobes a mixer design has, the lower pressure losses, the lower the uniformity of mixing, and the lower the effectiveness in sound suppression. Heretofore it has been common practice to optimize the number of lobes to achieve a satisfactory trade-off between sound suppression and pressure losses.

DISCLOSURE OF INVENTION

It is, therefore, an object of the present invention to mix a pair of coaxial air streams of disparate temperature and velocity to attenuate objectionable noise without inducing unacceptably large pressure losses. According to the present invention, coaxial inner and outer air streams are circumferentially segmented and interleaved and additional portions of the outer stream are diverted radially inwardly and combined with the inner and outer segments at discreet radial locations. Major lobes of a mixer for carrying out the disclosed method function similarly to those found on a conventional lobed mixer wherein the lobes define major chutes between pairs of major lobes. The chutes act as gas conduits whereby cool, low velocity fan air is driven into the chutes and directed into the hot high velocity core air flow to produce uniform circumferentially spaced segments of mixed air. As is typical in conventional lobed mixers, the segments that are produced have temperature gradients in the radial direction. The minor lobes of the present invention are positioned within each major lobe, forming minor chutes which channel cool fan air to the hottest region of each segment of mixed air. As a result, the mixed airflow exits the exhaust nozzle at a greater level of mixing and with a substantially lower overall velocity and associated noise producing potential.

The double lobed mixer for carrying out the method of the present invention is attached to the aft portion of a turbofan engine after the last low turbine stage by any conventional means. The major lobes increase in depth in an axially downstream direction distributed around the circumference of the mixer. Each pair of minor lobes define the radially outward surface of the major lobes. The minor lobes begin aft of the upstream end of the major lobes, having a length and depth which increase in an axially downstream direction. The surface area of the minor lobes is less than the surface area of the major lobes because the length and depth of the minor lobes are less than that of the major lobes and, therefore, the pressure losses associated with the minor lobes is less than the major lobes. The height and geometry of these minor lobes are such that cold low velocity fan flow is delivered at discreet locations within the hot high velocity core flow stream. The net effect of the disclosed method of noise suppression is to improve the mixing of the air by lowering its peak temperature and velocity noise prior to the exit of the exhaust nozzle.

BRIEF DESCRIPTION OF DRAWINGS

FIG. 2 is an elevation of the aft end of a turbofan engine partly broken away and partly in section, showing a portion of the double lobed mixer of FIG. 1.

FIG. 3 is a cross sectional view taken substantially along the line 3—3 of FIG. 2.

BEST MODE FOR CARRYING OUT THE INVENTION

Figure 1:
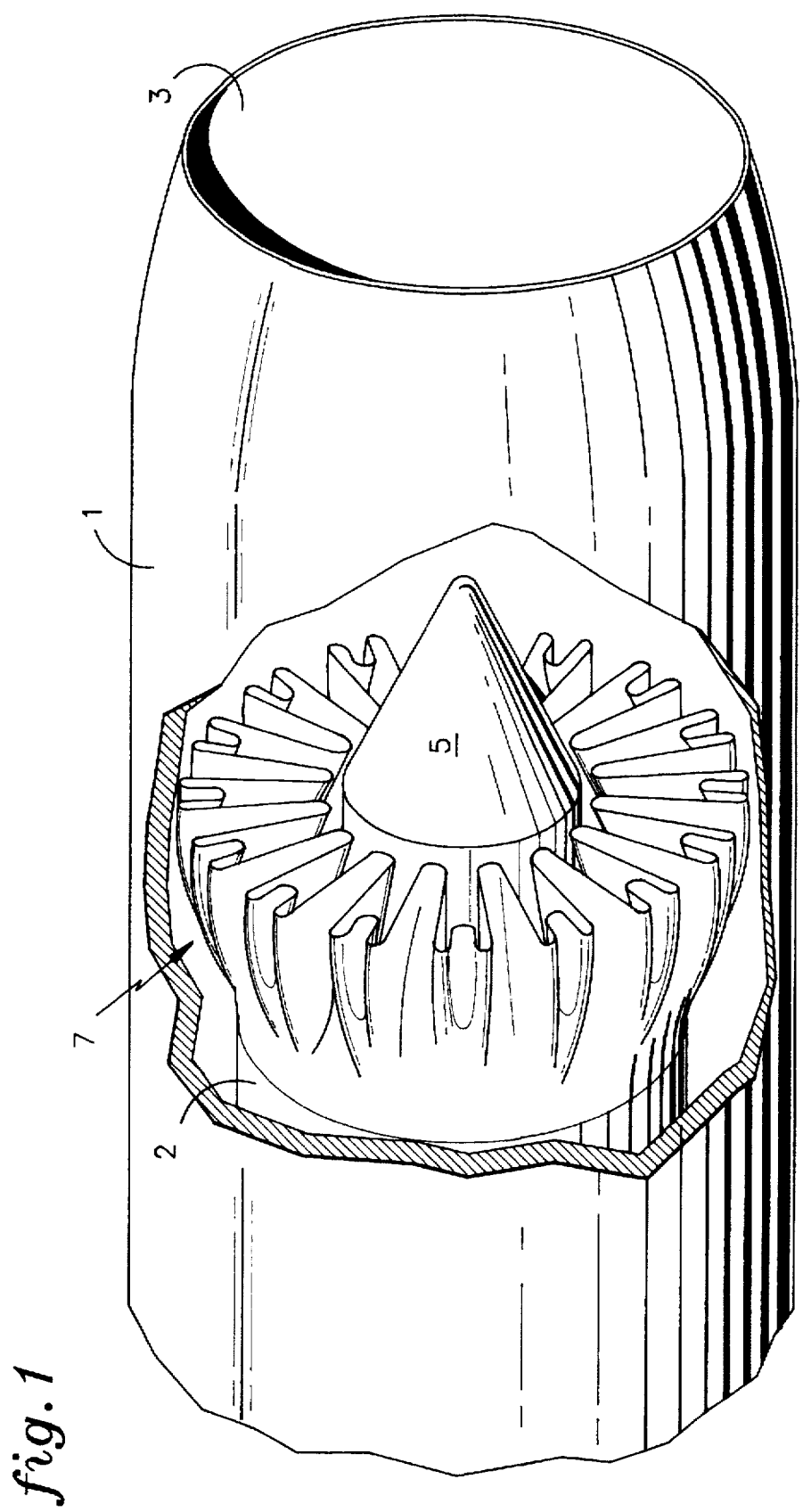
FIG. 1 is a view of the aft end of a turbofan engine partly broken away, and showing a perspective view of a double lobed mixer for carrying out the method of noise suppression according to the invention.

FIG. 1 illustrates the aft end of a turbofan engine having a nacelle 1. A portion of the nacelle 1 is cutaway in FIG. 1 to expose a turbine 2 and exhaust nozzle 3. In a typical turbofan engine air enters the upstream end of the engine. As is well known in the art and, therefore, not illustrated herein, as air enters the front of the jet engine it passes through the fan and is split into primary and by pass flow streams. The primary stream flows through one or more compressors which compress the air to a high pressure. The air is then mixed with fuel in a combustion chamber and the mixture is ignited and burned. The resultant combustion products then flow through one or more turbines which extract energy from the combustion gases to turn the fan and compressor. The gases then expand through an exhaust nozzle to produce thrust. The bypass stream is compressed by the fan, flows through an annular duct concentric with the core engine and is expanded through the exhaust nozzle to produce additional thrust. The two concentric flow streams rejoin to form a common stream at the turbine exhaust area of the engine. The two flows are mixed as described below and are discharged at the exhaust nozzle 3.

FIG. 2 shows a cross section of the mixer 7 of FIG. 1 through a cutaway of the nacelle 1 as viewed in the plane of the central axis of the engine. The inner surface of the nacelle 1 defines the outer boundary of the fan flow stream 4 and a plug 5 is shown defining the inner boundary of the core flow stream 6.

The velocity of the gas in the fan flow stream 4 is much lower than that of the core flow stream 6 exiting the turbine. As set forth hereinabove, the turbulent mixing of these two streams behind the engine, as well as the mixing of the high velocity air with ambient air behind the engine, produces a large component of the noise emitted from turbofan engines. Effective mixing of the two streams prior to their exiting of the engine lowers the overall velocity of the gases before exiting the exhaust nozzle of the turbofan engine and is effective in reducing the noise emitted by the engine. The mixing of the two flow streams is effected by the double lobed mixer 7 which directs a portion of the fan flow stream 4 radially inwardly and a portion of the core flow stream 6 radially outwardly. The double lobed mixer 7 shown in FIG. 3 is a hollow duct having a sinuously shaped body having major lobes 8 minor lobes 9, major chutes 10 and minor chutes 11. A pair of minor lobes 9 is present at the radially outermost portion of each of the major lobes 8. A minor chute 11 is formed between each of the minor lobes 9. Both major and minor chutes act as conduits to direct fan flow 4 inwardly and the radially inner surfaces of the lobes act as conduits to direct core flow 6 outwardly to force the two flows to mix prior to exiting the exhaust nozzle 3. The double lobed mixer 1 shown in the drawings has sixteen major lobes 8.

The double lobed mixer 7 is shaped to prevent separation and associated pressure losses. The major lobe height 12 and major lobe width 13 both increase in the axially downstream direction. The increasing lobe width 13 has the effect of accelerating the fan flow 4 through the major chute 10 thereby minimizing pressure losses.

The two flow streams mix together in the mixing region 14 and form mixed segments 15 of relatively uniform velocity, the number of mixed segments being equal to the number of major lobes 8 of the mixer. Prior art methods of mixing use mixers having lobes as illustrated in phantom in FIG. 3. Such mixers exhibit incomplete mixing in the radial direction of each mixed segment 15 and give rise to localized unmixed regions of core flow, or hot spots 16, that remain near the center of each mixed segment 15. The hot spots 16 generally occur near the radially outward portion of the major lobes and therefore the addition of more major lobes, within practical limits, would function only to make the hot spots smaller and more numerous, but would not eliminate them. The flow associated with these hot spots exits the engine at the unmixed velocity of the core flow and therefore produces a large amount of noise.

According to the present invention, the radial and circumferential location of the hot spots 16 are analytically predicted and each minor chute 11 is located between two minor lobes 9 to direct a jet of fan flow at the location where a hot spot would otherwise exist. Because the location of the hot spots is generally radially outwardly within each mixed segment 15, the minor lobes 9 and the minor chutes 11 formed therebetween never approach the height and width of the major lobes 8 and the major chutes 10. The deliberate direction of additional fan flow 4 into the vicinity of the hot spot 16 eliminates this otherwise unmixed region and produces mixed segments of circumferential and radial uniform velocity prior to the gases exiting the engine. The result of the increased uniformity of mixing of the two flows is a significant reduction in the noise emitted by the engine. In addition, the added surface area of the minor lobes 9 and the minor chutes 10 is much less than that which would result from adding major lobes 8 and major chutes 10 and, therefore, minimizes additional pressure losses. The benefit of improved mixing without significant pressure loss makes the double lobed mixer a commercially viable sound suppression device.

In operation, the major lobes 8 and major chutes 10 segment the inner and outer flow steams into circumferentially interleaved inner and outer segments, the segmentation and interleaving beginning at a common location along the engine axis. The minor lobes 9 and minor chutes 11 divert an additional portion of the outer stream radially inwardly beginning at an axial location downstream of the common location and at a circumferential location intermediate the circumferential extremities of the inner segments. The inner and outer segments and the additional portions are combined into a common steam in the mixing region 14 so that the additional portions are introduced into discreet radial locations in the common stream.

While we have described particular embodiments of the current invention for purposes of illustration, it is well understood that other embodiments and modifications are possible within the spirit of the invention. Accordingly, the invention is not to be limited except by the scope of the appended claims.

We claim:

1. A method for suppressing noise in a turbofan engine, the engine having a longitudinally extending central axis, coaxial inner and outer flowpaths for carrying inner and outer fluid flow streams through the engine, the method characterized by:

segmenting the inner and outer flow streams into circumferentially interleaved inner and outer segments, the segmentation of the streams beginning at a common location along the engine axis, and the segments increasing in radial extent in the downstream direction;

diverting additional portions of the outer stream radially inwardly, the additional portions being diverted from the outer stream at an axial location downstream of the common location and at circumferential locations intermediate circumferential extremities of each inner segment; and combining the inner segments, the outer segments and the additional portions into a common stream so that the additional portions are introduced into discrete radial locations in the common stream.

2. The method of claim 1 characterized in that a radial extent of the diverted additional portions is less than the radial extent of the interleaved inner and outer segments.

\* \* \* \* \*